Figure 1:
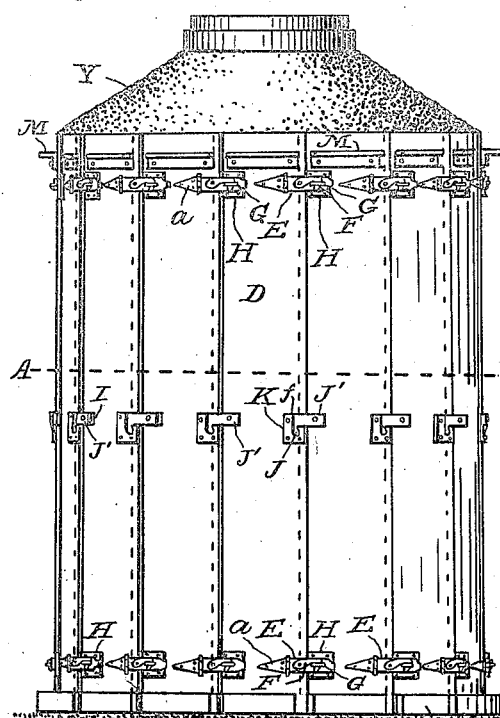

No. 820,160. PATENTED MAY 8, 1906.
J. H. WIEST.
FORM FOR MOLDING CONCRETE CISTERNS.
APPLICATION FILED SEPT. 30, 1905.

3 SHEETS—SHEET 1.

Witnesses:
E. R. Martin.
Stella Snider.

Inventor:
Jonas H. Wiest,
by E. T. Silvius,
Attorney.

No. 820,160. PATENTED MAY 8, 1906.
J. H. WIEST.
FORM FOR MOLDING CONCRETE CISTERNS.
APPLICATION FILED SEPT. 30, 1905.
3 SHEETS—SHEET 2.
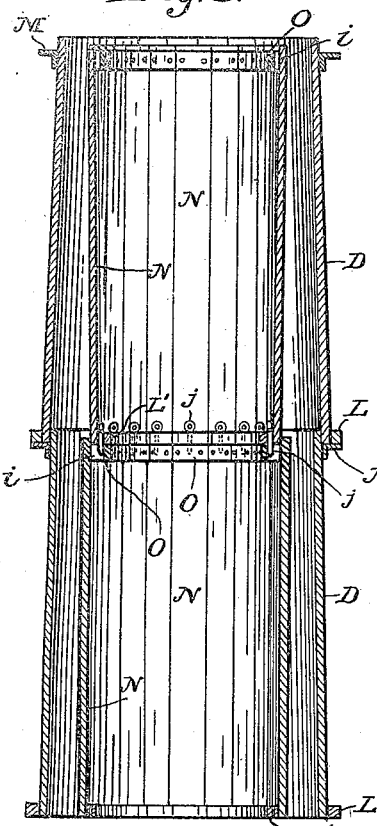
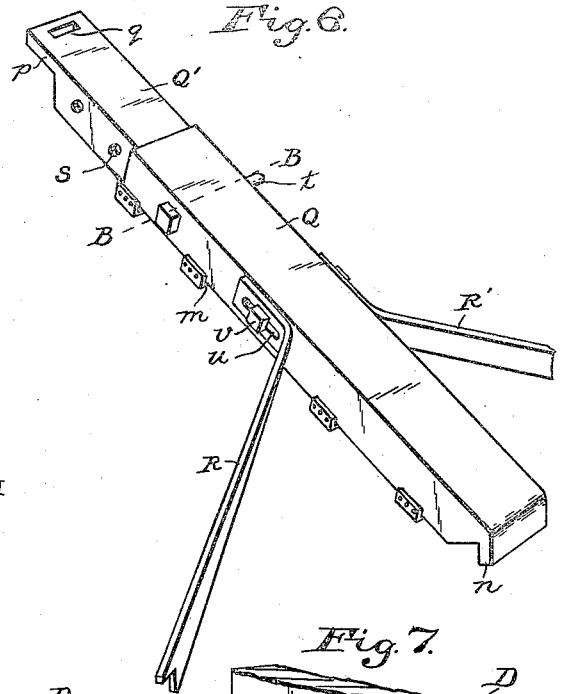
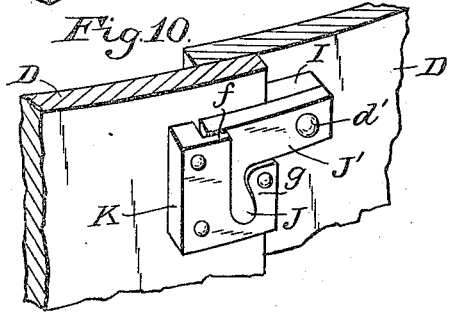
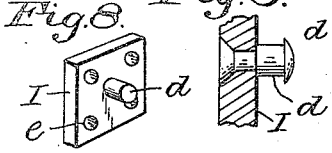
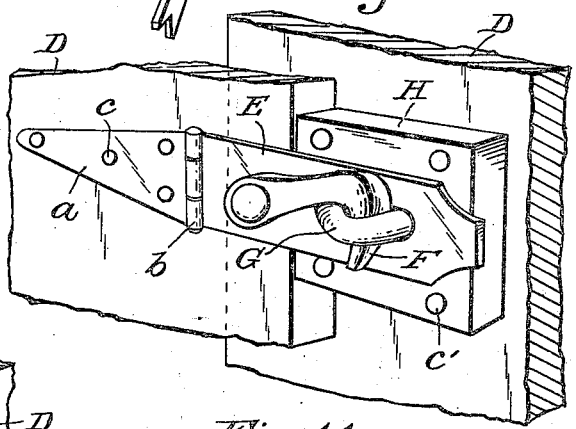
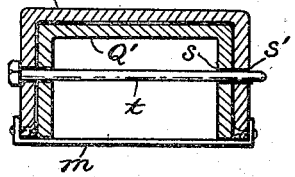
Witnesses:
E. R. Martin
Stella Snider
Inventor:
Jonas H. Wiest,
by E. T. Silvius,
Attorney.

No. 820,160. PATENTED MAY 8, 1906.
J. H. WIEST.
FORM FOR MOLDING CONCRETE CISTERNS.
APPLICATION FILED SEPT. 30, 1905.

3 SHEETS—SHEET 3.

Witnesses:
E. R. Martin.
Stella Snider.

Inventor:
Jonas H. Wiest,
by E. T. Silvius,
Attorney.

UNITED STATES PATENT OFFICE.

JONAS H. WIEST, OF INDIANAPOLIS, INDIANA.

FORM FOR MOLDING CONCRETE CISTERNS.

No. 820,160.     Specification of Letters Patent.     Patented May 8, 1906.

Application filed September 30, 1905. Serial No. 280,745.

*To all whom it may concern:*

Be it known that I, JONAS H. WIEST, a citizen of the United States, residing at Indianapolis, in the county of Marion and State of Indiana, have invented new and useful Improvements in Forms for Molding Concrete Cisterns; and I do declare the following to be a full, clear, and exact description of the invention, reference being had to the accompanying drawings, and to the letters of reference marked thereon, which form a part of this specification.

This invention relates to forms that are designed to be used in constructing concrete cisterns and silos; and the invention has particular reference to sectional adjustable forms whereby plastic material may be molded to form solid integral walls of concrete for various sizes of cisterns or silos.

Objects of the invention are to provide forms that may be employed in the construction either of deep silos or of cisterns having relatively less depth either in or upon the ground, to provide improved couplers for the sections that form the sides of the structures, to improve the construction of rafters and roof-forms and supports therefor, and to provide improved forms for molding the necks of the cisterns or silos.

Other objects are to provide cisterns-forms that may be constructed at reasonable cost and be durable and economical in use.

With the above-mentioned and minor objects in view the invention consists in cistern-forms comprising sectional side forms having couplers of novel construction and arrangement, longitudinally-contractible rafters of novel construction, novel supports for the rafters, novel extensible roof-forms, and novel adjustable neck-forms.

The invention consists, further, in sectional internal side forms having less diameter at the bottom than at the top thereof and provided with means for supporting the bottom of one form within the top of another form, and sectional external side forms having greater diameter at the bottom than at the top thereof provided with means for supporting the bottom of one form on the exterior of the top of another form; and the invention consists, further, in the novel parts and in the combinations and arrangements of parts, as hereinafter particularly described and claimed.

Figure 2:
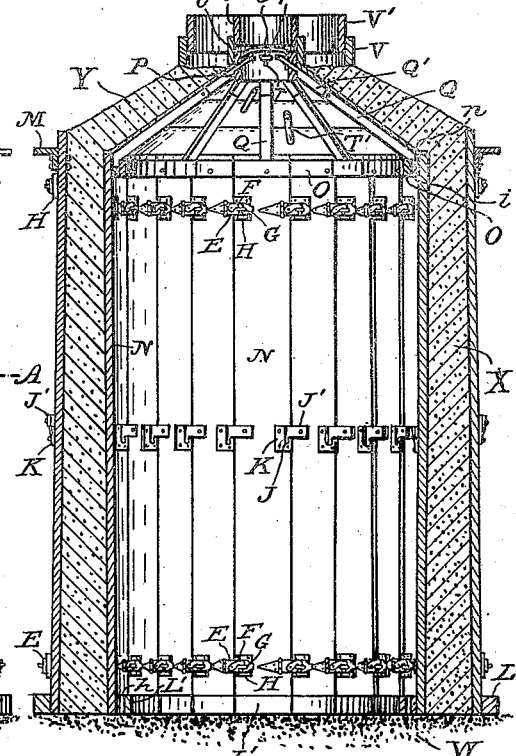
Figure 3:
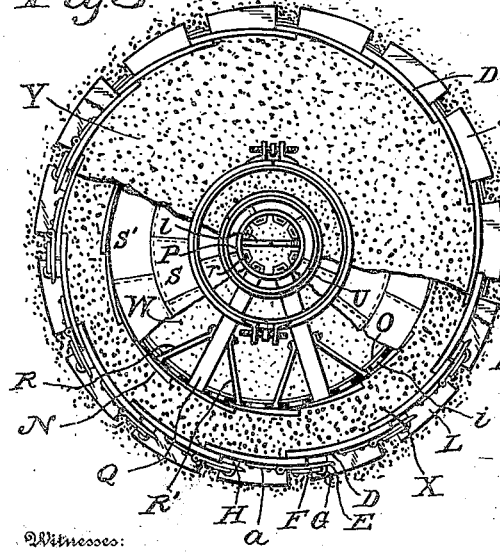
Figure 4:
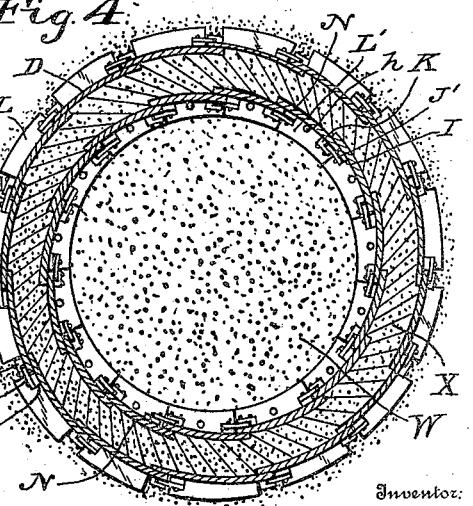
Figure 12:
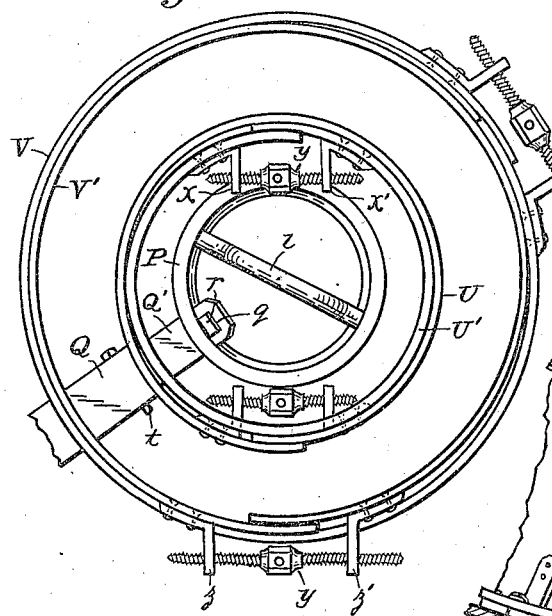
Figure 13:
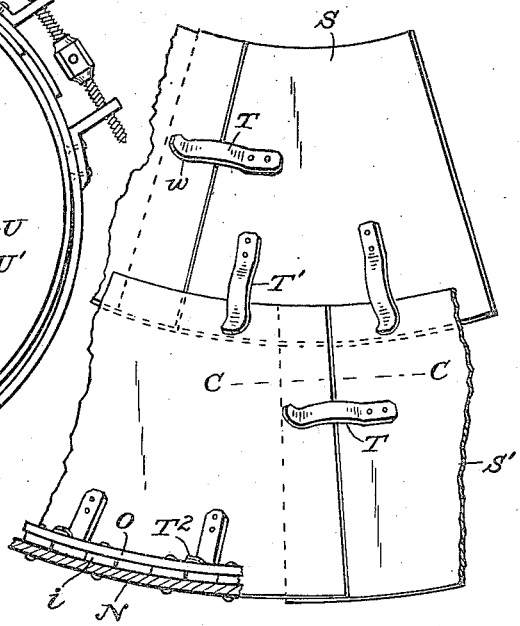
Figure 14:
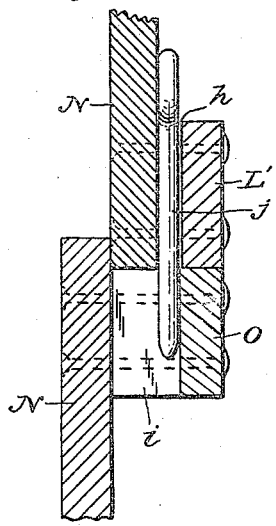
Figure 15:
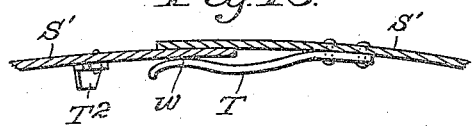
Figure 16:
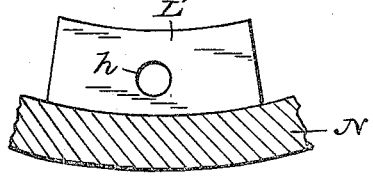
Figure 17:
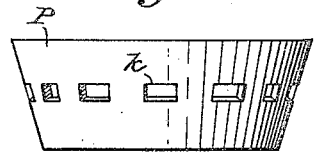

Referring to the drawings, Figure 1 is a side elevation of a cistern-form constructed in accordance with the invention and having a cistern-wall above ground shown therewith; Fig. 2, a vertical central sectional view thereof; Fig. 3, a top plan with portions broken away; Fig. 4, a horizontal sectional view approximately on the line A A in Fig. 1; Fig. 5, a vertical central sectional view of two sets of side forms arranged one set upon the other for constructing a relatively deep silo above ground, the couplings of the sections being omitted; Fig. 6, a perspective view of one of the rafters constructed substantially in accordance with the invention; Fig. 7, a fragmentary perspective view showing two sections of a side form provided with a type of coupler that is preferably employed at the tops and bottoms of the sections; Fig. 8, a perspective view of a pivot and its base forming part of a type of coupler that is used at the middle portions of the side forms; Fig. 9, a sectional view of the pivot-base; Fig. 10, a fragmentary perspective view showing middle portions of two side-form sections provided with the coupler that is designed therefor; Fig. 11, a transverse sectional view on the line B B in Fig. 6; Fig. 12, a top plan of the neck-forms and the center ring for connecting the inner ends of the rafters together, a portion of a rafter being shown in connection therewith; Fig. 13, a fragmentary sectional view of a side section of a form looking upwardly and showing the under sides of the roof-plates and connections thereof, the rafters being omitted; Fig. 14, a fragmentary sectional view showing one side section matched on another like section; Fig. 15, a fragmentary sectional view approximately on the line C C in Fig. 13; Fig. 16, a fragmentary horizontal sectional view of a side-form section, taken near the lower end thereof; and Fig. 17, a side elevation of the rafter center ring.

Similar reference characters in the drawings designate corresponding elements or features.

In the drawings, D designates the sections of which the form is composed that forms the outer face of the vertical wall of the cistern or silo when built above ground, there being a suitable number of the sections provided so that a greater or lesser number thereof may be used corresponding to the diameter of structure that may be desired, each section being concavo-convex in cross-section. Each section is provided with couplers that are attached to the exterior near the edges thereof.

there being two couplers near the top and two couplers near the bottom of the section and also two couplers at the middle of the section. The top and bottom couplers near one edge of the section comprise each a hasp E, that is connected to a plate $a$ by a hinge $b$, the plate being secured to the section by rivets $c$ and a hook F, that is tapering wedge-like and pivoted to the hasp. The couplers near the other edge of the section comprise each an eye G, that is attached to a plate H, which is secured to the section by rivets $c'$, the plate serving as a gage for the adjacent section of the form that overlaps the edge of the section to which the plate H is attached. The hasp is adapted to receive the eye, and the hook is adapted to enter the eye and draw the hasp close to the plate H, thereby locking the two sections of the form together.

The middle couplers comprise each a plate I, to which is attached a pivot-stud $d$ and having rivet-holes $e$ for securing the plate, which is attached to the form-section near the edge at which the plates H are attached, there being a hook J, having a hook-bar $J'$, mounted pivotally on the stud $d$, the end of the stud being upset to form a head $d'$, the couplers near the opposite edges of the sections comprising each a block K, that is secured fixedly to the form-section and having a lip $f$, behind which the free end of the hook-bar $J'$ may be moved, the block having also a projection $g$ to be engaged by the hook J.

A foot L, preferably of wood, is attached to the exterior of the lower end of each form-section D, and the exterior of the upper part of each section is provided with a shoulder M, preferably composed of angle-iron, the shoulder being located slightly below the top of the section for supporting the bottom of another section when forming a silo.

The external form above described will not be required when forming a cistern-wall in a pit.

The form for forming the interior face of a cistern or silo wall comprises a suitable number of sections N, each concavo-convex in cross-section and provided on the inner or concave side with couplers identical to those above described and arranged on the sections similarly to those on the exterior form-sections. Each section N has a foot $L'$, preferably of wood, attached to the concave side, at the lower end thereof, the foot having a pin-hole $h$ therein to receive a pin $j$. The upper end part of the section is provided with a rafter-support O, that is secured against a number of spacing-blocks $i$, which are secured to the section, the top of the rafter-support being slightly lower than the top of the section.

The rafter-ring P preferably has inclined sides and has apertures $k$ therein to receive the inner ends of the rafters, the ring being metallic, and it is provided with a suitable bail $l$ for temporarily supporting it when connecting the rafters thereto and disconnecting them therefrom.

The rafters comprise each a pair of telescopic parts Q and $Q'$, formed of channel-iron or of other suitable metallic members, the part Q having guides $m$ secured thereto for guiding the part $Q'$ in the channel thereof, the part Q being greater in diameter than the other part. Said part Q is provided at an end thereof with a lug $n$ for insertion between a support O and a side section N, while the adjacent end part of the rafter may rest upon the rafter-support. The outer end of the part $Q'$ has a relatively small projection $p$ for insertion in an aperture $k$ of the rafter-ring P, the projection having a keyhole $q$ to receive a key $r$ at the inner side of the ring. The part $Q'$ has a number of pin-holes $s$, and the part Q has pin-holes $s'$, receiving a locking-pin $t$ to prevent longitudinal movements of the parts of the rafter either one with respect to the other one. The rafter has wings R and $R'$, having slots $u$ therein, whereby they are adjustably secured by screws $v$ to the part Q, the free ends of the wings being adapted to rest upon the rafter-supports O.

The roof-plates are designed to overlap one another adjustably, there being a suitable number of plates, as the inner plates S and outer plates $S'$, all provided with spring-clips T, the inner plates having spring-clips $T'$ and the outer plates having gages $T^2$, adapted to engage the rafter-supports O, the spring-clips having curved end parts $w$, adapted to press forcibly against adjacent plates that overlap the edges of the plates to which the clips are attached.

The neck-forms comprise two bands U and $U'$, one telescoping with the other for forming the inner face of the wall of the neck of the cistern, each band being split and provided with ears $x$ and $x'$, in which is a right and left hand screw $y$ for expanding or contracting the band, and two bands V and $V'$, one telescoping with the other for forming the outer face of the cistern-neck, each band being split and having ears $z$ and $z'$, in which is a screw $y'$.

In practical use a concrete bottom W is first formed, and then the side form or forms are set up on the bottom and the sections thereof locked together, after which the side walls X may be built up of the plastic material. The rafters are to be adjusted to proper lengths and placed upon the rafter-supports and their inner ends connected together by the rafter-ring $p$, then the roof-plates are to be placed upon the rafters so as to extend from the top of the side-form sections N to the ring P, after which the inner neck-form should be adjusted as to length and placed upon the roof-plates. Then the cistern roof or dome Y may be formed, after which the outer neck-form may be placed upon the dome, and the neck may then be formed, thus completing the cistern or silo. After the plastic material becomes sufficiently hardened the neck-forms may be removed, then the ring P may be suitably supported, the keys r may be removed, and then the pins t may be withdrawn, so that the parts Q' may be driven into the parts Q of the rafters, and thus released from the rafter-ring. The outer ends of the rafters may then be removed from the rafter-supports O, after which the roof-plates may be removed, and then the sections of the side form or forms may be uncoupled and the sections removed, after which a coat of cement may be floated on the interior of the cistern-walls.

Having thus described the invention, what is claimed as new is—

1. A cistern-form including side sections, a rafter-ring having apertures therein, rafters comprising each a stationary part for engagement with a side section and a relatively movable part having a projection insertible into the apertures of the rafter-ring, and means for fixing the two parts of the rafter one to the other.

2. A cistern-form including side sections provided with rafter-supports, a rafter-ring having apertures therein, rafters comprising each a stationary part having a lug for engagement with a rafter-support and a relatively movable part telescoping into the stationary part and provided with a projection insertible into the apertures of the rafter-ring, and a pin removably connected with the two parts of the rafter.

3. A cistern-form including side sections provided near the tops thereof with rafter-supports, a rafter-ring having apertures therein, rafters each comprising a stationary part having a lug for engagement with the rafter-supports and a relatively movable part having a projection provided with a keyhole and insertible into the apertures of the rafter-ring, and keys for insertion into the keyholes.

4. A cistern-form including side sections, a rafter-ring, contractible rafters for engagement with the side sections and also with the rafter-ring, roof-plates having gages for engagement with the side sections, and roof-plates having spring-clips for engagement with adjacent roof-plates.

5. A cistern or silo form including interior side sections, gages secured to the side sections and having stationary coupling devices attached thereto, movable coupling devices attached also to the side sections for engagement with the stationary devices of the gages of adjacent sections, spacing-blocks secured to the sections, and rafter-supports attached to the spacing-blocks.

6. In a cistern-form, the combination of side sections each having a foot attached thereto provided with a pin-hole, spacing-blocks secured to the side sections, supports attached to the spacing-blocks, and pins insertible through the holes in the feet of the side section and into the spaces between the spacing-blocks, a rafter-ring, a plurality of rafters, and a plurality of roof-plates.

7. In a cistern-form, the combination of side sections, a rafter-ring, a plurality of rafters, a plurality of roof-plates for the rafters having each a plurality of spring-clips secured thereto formed with a portion thereof curved against the roof-plate, and a plurality of roof-plates having each a spring-clip and also a gage secured thereto.

8. In a cistern-form, the combination of side-form sections, a rafter-ring having openings in the wall thereof, rafters comprising each a stationary part having a pin-hole therein and having also a bearing end for engagement with a side section, a pair of wings attached to the stationary part and having bearing ends also for engagement with a side section, a relatively movable part having a pin-hole therein and telescoping with the stationary part and provided with a projection insertible in an opening of the rafter-ring, and a pin insertible into the pin-holes of the two parts of the rafter.

9. In a cistern-form, the combination of side-form sections, a rafter-ring, rafters comprising each a stationary part for connecting with a side section and having a wing adjustably attached thereto also for connecting with a side section, a relatively movable part telescoping with the stationary part for engagement with the rafter-ring, and a pin connected removably with the two parts of the rafter.

10. In a cistern-form, the combination of a plurality of inner side sections, rafter-supports attached to the side sections, a rafter-ring having inclined sides and apertures therein, rafters having each a projection insertible into the apertures of the rafter-ring and having also a lug for engagement with the rafter-supports, a bail connected to the rafter-ring, roof-plates to be supported by the rafters, and neck-forms to be supported by the roof-plates.

11. In a cistern-form the combination of side-form sections provided each with a rafter-support, a rafter-ring having inclined sides and apertures therein, rafters each comprising a stationary part for connection with a rafter-support and a part telescoping in the stationary part and having a projection insertible in either one of the apertures of the rafter-ring, and roof-plates to be supported by the rafters.

12. In a cistern-form, the combination of side-form sections, a rafter-ring, a plurality of rafters, and a plurality of roof-plates to be supported by the rafters and provided each with a gage attached to the under side thereof for engagement with the side-form sections.

13. In a cistern-form, the combination of side-form sections, a rafter-ring, a plurality of rafters for connecting to the side-form sections and the rafter-ring, and a plurality of roof-plates to be supported by the rafters and provided each with a spring-clip secured at one end thereof thereto and having a portion thereof curved against the roof-plate for engaging an adjacent roof-plate.

14. In a cistern-form, the combination of side-form sections with couplers therefor, a rafter-ring, rafter-supports attached to the side-form sections, rafters each comprising a part for engagement with the rafter-supports and having a pin-hole therein, a part movably connected with the stationary part for engagement with the rafter-ring and having a pin-hole therein, and a pin insertible into the pin-holes of the two parts of the rafter.

15. In a cistern or silo form, the combination of a rafter comprising a part having a pin-hole therein and provided with a lug on an end thereof, a part telescoping with the other part and having a pin-hole therein and provided at an end thereof with a projection having a keyhole therein, a pin insertible in the pin-holes of the two parts, and a key insertible in the keyhole.

16. In a cistern or silo form, the combination of a plurality of rafters having each a telescoping part provided at an end thereof with a projection having a keyhole therein, a rafter-ring having the wall thereof inclined to the planes of the ends of the ring and provided with openings in the wall thereof receiving the projections of the rafter parts, and keys in the keyholes of the projections and bearing against the inclined wall of the ring, the axes of the rafters being approximately at right angles to the contiguous inclined wall of the ring.

17. In a cistern or silo form, the combination with a plurality of telescoping rafters each having a part provided with a projection at an end thereof provided with a keyhole, of a rafter-ring having openings in the wall thereof receiving the projections removably and provided with a bail for the temporary support thereof, and keys removably inserted in the keyholes of the projection bearing against the wall of the ring.

18. In a cistern or silo form, the combination of a plurality of lower inner side sections with couplers therefor, rafter-supports attached to the side sections, a plurality of upper inner side sections with couplers therefor and resting on the rafter-supports and having rafter-supports attached thereto, a rafter-ring having openings therein, rafters having lugs engaging the rafter-supports of the upper inner side section and having also projections inserted removably in the openings of the rafter-ring, roof-plates supported by the rafters, and neck-forms supported by the roof-plates, with outer side sections arranged about the lower and upper inner side sections In testimony whereof I affix my signature in presence of two witnesses.

JONAS H. WIEST.

Witnesses:
E. T. SILVIUS,
S. SNIDER.